(12) United States Patent
Huang et al.

(10) Patent No.: US 12,401,246 B2
(45) Date of Patent: Aug. 26, 2025

(54) MOTOR, POWER SYSTEM, CONTROL METHOD, AND ELECTRIC VEHICLE

(71) Applicant: CONTEMPORARY AMPEREX TECHNOLOGY (HONG KONG) LIMITED, Hong Kong (CN)

(72) Inventors: Xiaojian Huang, Fujian (CN); Xiyang Zuo, Fujian (CN); Zhimin Dan, Fujian (CN); Bao Li, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 245 days.

(21) Appl. No.: 17/878,368

(22) Filed: Aug. 1, 2022

(65) Prior Publication Data

US 2022/0368262 A1 Nov. 17, 2022

Related U.S. Application Data

(63) Continuation of application No. PCT/CN2020/106473, filed on Jul. 31, 2020.

(51) Int. Cl.
*H02K 3/28* (2006.01)
*B60L 50/51* (2019.01)
(Continued)

(52) U.S. Cl.
CPC .............. *H02K 3/28* (2013.01); *B60L 50/51* (2019.02); *B60L 58/27* (2019.02); *H02K 11/30* (2016.01); *H02P 25/22* (2013.01)

(58) Field of Classification Search
CPC .......... H02P 25/22; H02P 29/62; B60L 50/51; B60L 58/27; B60L 2220/56;
(Continued)

(56) References Cited

U.S. PATENT DOCUMENTS

2008/0185933 A1* 8/2008 Baba .................... H02K 3/28
310/198
2010/0071970 A1* 3/2010 Welchko ................ H02P 5/74
318/400.26
(Continued)

FOREIGN PATENT DOCUMENTS

CN 1564428 A 1/2005
CN 201414062 Y 2/2010
(Continued)

OTHER PUBLICATIONS

Extended European Search Report dated Nov. 28, 2022 received in European Patent Application No. EP 20946739.8.
(Continued)

*Primary Examiner* — Alexander A Singh
(74) *Attorney, Agent, or Firm* — Scully, Scott, Murphy & Presser, P.C.

(57) ABSTRACT

An electric motor, a power system, a control method, and an electric vehicle. The electric motor comprises a first N-phase winding set and a second N-phase winding set, wherein the first N-phase winding set and the second N-phase winding set are both used for being connected to a traction battery by means of a conversion module. When the traction battery starts to be heated, the first N-phase winding set and the second N-phase winding set are powered on. The direction of a magnetic field generated by the first winding set and the direction of a magnetic field generated by the second winding set have a phase difference, such that the magnetic fields counteract each other; and a magnetic field intensity in a stator winding of each phase is reduced, and an air-gap magnetic flux is also reduced, thereby alleviating the problems of electric motor heating and electric motor NVH.

17 Claims, 4 Drawing Sheets

(51) Int. Cl.
*B60L 58/27* (2019.01)
*H02K 11/30* (2016.01)
*H02P 25/22* (2006.01)

(58) Field of Classification Search
CPC ..... B60L 2240/425; B60L 58/25; H02K 3/28; H02K 11/30; H02K 11/33; B60H 1/143
USPC .............................................. 310/184, 68 R
See application file for complete search history.

(56) References Cited

U.S. PATENT DOCUMENTS

| | | |
|---|---|---|
| 2013/0052490 A1 | 2/2013 | TenHouten et al. |
| 2016/0152151 A1 | 6/2016 | Yang et al. |
| 2018/0141458 A1* | 5/2018 | Jammoul ................ B60L 58/27 |
| 2022/0368262 A1* | 11/2022 | Huang .................... B60L 50/51 |

FOREIGN PATENT DOCUMENTS

| | | |
|---|---|---|
| CN | 107666026 A | 2/2018 |
| CN | 107834947 A | 3/2018 |
| CN | 110048192 A | 7/2019 |
| CN | 110116653 A | 8/2019 |
| CN | 210225008 U | 3/2020 |
| CN | 111391719 A | 7/2020 |
| CN | 111439132 A | 7/2020 |

OTHER PUBLICATIONS

International Search Report dated Apr. 26, 2021 issued in PCT/CN2020/106473.
First Office Action dated Apr. 1, 2024 received in Chinese Patent Application No. CN 202080073217.9.

* cited by examiner

MOTOR, POWER SYSTEM, CONTROL METHOD, AND ELECTRIC VEHICLE

CROSS-REFERENCE TO RELATED APPLICATIONS

This application is a continuation of International Application No. PCT/CN2020/106473, filed on Jul. 31, 2020, the disclosure of which is hereby incorporated by reference in its entirety.

TECHNICAL FIELD

This application relates to the field of electric vehicles, and more specifically, to a motor, a power system, a control method, and an electric vehicle.

BACKGROUND

Electric vehicles are vehicles powered by traction batteries. Limited by traction battery materials, traction batteries can stably exert optimal performance only at its rated cell temperature. Therefore, when an electric vehicle is to be used in an area where the cell temperature is low, the traction battery needs to be heated to the rated cell temperature.

Existing traction battery heating methods may include indirect heating and direct heating. The indirect heating refers to heating a traction battery through a heat source outside the traction battery. The direct heating refers to heating a traction battery from inside. A direct heating method currently proposed in the industry is to heat a traction battery by using a motor. However, when the existing motor provides heating currents to the traction battery, severe rotor-generated heat and a motor NVH (full name: Noise, Vibration, Harshness) problem may occur, which affects motor life and reduces passenger comfort. Therefore, the heat generation and NVH problems of the motor require an urgent solution.

SUMMARY

This application provides a motor, a power system, a control method, and an electric vehicle, to resolve the technical problems of large rotor-generated heat and substandard motor NVH indicators when the motor is operating to provide a heating current for a traction battery.

According to a first aspect, this application provides a motor, including an N-phase first winding set and an N-phase second winding set, where N is a positive integer, and the motor is configured to heat a traction battery; and
  when the motor heats the traction battery, the first winding set and the second winding set are energized, and a phase difference is caused between a direction of a magnetic field generated by the first winding set and a direction of a magnetic field generated by the second winding set, where a total magnetic flux of the magnetic fields generated by the first winding set and the second winding set is within a preset magnetic flux threshold range.

According to the motor of this embodiment, the first winding set and the second winding set are the stator windings of the motor. The first winding set and the second winding set respectively include two sub-winding sets. When the motor is used to heat the traction battery, currents are applied to the two sub-winding sets, and a phase difference is caused between magnetic fields generated by the two sub-winding sets. The magnetic fields generated by the two sub-winding sets cancel each other out, so that magnetic field strength of the stator winding is reduced, and an air gap magnetic flux is reduced, thereby alleviating the heat generation and NVH problems of the motor.

In some embodiments, the first winding set and the second winding set are located in the same stator slot.

According to this embodiment, the direction of the magnetic field generated by the first winding set is opposite to the direction of the magnetic field generated by the second winding set, reducing the air gap magnetic flux and alleviating the heat generation and NVH problems of the motor.

In some embodiments, the first winding set and the second winding set are located in adjacent stator slots.

According to this embodiment, there is a phase difference between the magnetic field generated by the first winding set and the magnetic field generated by the second winding set, and the two magnetic fields partially cancel each other out, thereby reducing the air gap magnetic flux.

In some embodiments, the first winding set is located at the bottom of the stator slot, and the second winding set is located at the opening of the stator slot.

In some embodiments, a phase difference between a current to the first winding set and a current to the second winding set is within a preset phase threshold, and an amplitude difference therebetween is within a preset amplitude threshold.

According to this embodiment, the phase difference between the current to the first winding set and the current to the second winding set is within the preset phase threshold. Therefore, there is a phase difference between the magnetic fields generated by the first winding set and the second winding set, and an amplitude difference therebetween is within the preset amplitude threshold, thereby reducing the total air gap magnetic flux.

According to a second aspect, this application provides a power system, including a traction battery, a conversion module, and the motor according to the first aspect and optional solutions;
  where a direct current side of the conversion module is connected to positive and negative electrodes of the traction battery, a first alternating current side of the conversion module is connected to the first winding set, and a second alternating current side of the conversion module is connected to the second winding set.

In some embodiments, the conversion module includes a three-leg inverter;
  where a direct current side of the three-leg inverter is connected to the positive and negative electrodes of the traction battery, an alternating current side of the three-leg inverter is connected to the first winding set, and a switch assembly is connected between the alternating current side of the three-leg inverter and the second winding set.

In some embodiments, the conversion module includes two three-leg inverters;
  where direct current sides of the two three-leg inverters are both connected to positive and negative electrodes of the traction battery, an alternating current side of one three-leg inverter is connected to the first winding set, and an alternating current side of the other three-leg inverter is connected to the second winding set.

In some embodiments, the conversion module includes a six-leg inverter, and the six-leg inverter includes two alternating current sides;
  where a direct current side of the six-leg inverter is connected to positive and negative electrodes of the traction battery, one alternating current side of the six-leg inverter is connected to the first winding set, and the other alternating current side of the six-leg inverter is connected to the second winding set.

In some embodiments, neutral points of the second winding set are connected to neutral points of the first winding set.

According to a third aspect, this application provides a heating control method, where the method is applied to a power system, and the power system includes a motor, an inverter, and a traction battery; the method is performed on a motor controller unit; and the method includes:

receiving a cell temperature of the traction battery and operating state information of the motor;

determining whether a heating condition is met based on the cell temperature and the operating state information; and under the condition that a determining result is yes, causing the traction battery to energize a first winding set and a second winding set, and causing a phase difference between a direction of a magnetic field generated by the first winding set and a direction of a magnetic field generated by the second winding set, where a total magnetic flux of the magnetic fields generated by the first winding set and the second winding set is within a preset magnetic flux threshold range.

In some embodiments, the inverter includes a switch assembly; and the energizing a first winding set and a second winding set specifically includes:

inputting a pulse width modulation PWM signal to the switch assembly of the inverter to control an on-off state of the switch assembly.

According to a fourth aspect, this application provides an electric vehicle, including a power system, where the power system includes a traction battery, a conversion module, and the motor according to the first aspect and optional solutions.

This application provides a motor, a power system, a control method, and an electric vehicle. The motor is connected to a traction battery through a conversion module. A stator winding of the motor includes two sub-winding sets. When the traction battery needs to be heated, currents are applied to the two sub-winding sets, and a phase difference is caused between magnetic fields generated by the two sub-winding sets. Therefore, the magnetic fields generated by the two sub-winding sets cancel each other out, so that magnetic field strength of the stator winding is reduced, and an air gap magnetic flux is reduced, thereby alleviating the heat generation and NVH problems of the motor.

DESCRIPTION OF EMBODIMENTS

Figure 1:
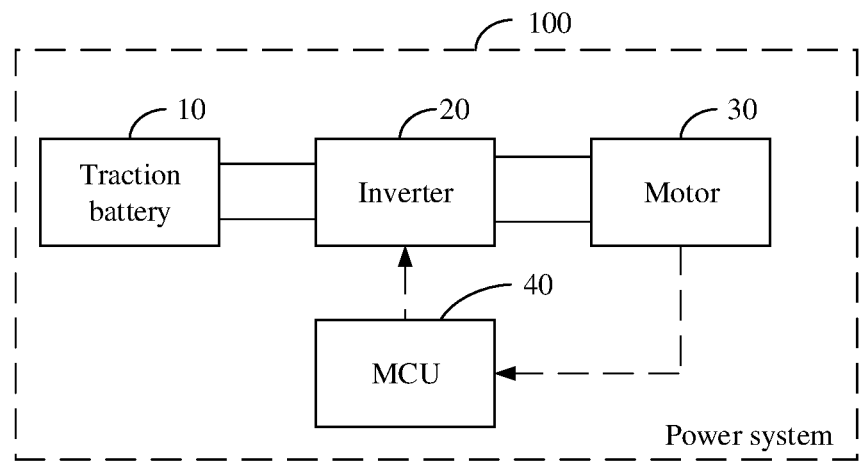
FIG. 1 is a schematic circuit diagram of a power system of an electric vehicle according to this application.

Electric vehicles are vehicles powered by traction batteries. As shown in FIG. 1, a power system 100 of an electric vehicle includes a traction battery 10, an inverter 20, a motor 30, and a motor controller unit (Motor Controller Unit, MCU for short) 40. Positive and negative electrodes of the traction battery 10 are connected to a direct current side of the inverter 300, and an alternating current side of the inverter 20 is connected to a stator winding of the motor 30. When the electric vehicle is running, the traction battery 10 supplies electrical energy to the motor 30 through the inverter 20, and the motor outputs power to drive the vehicle. The MCU 40 has a plurality of input terminals for receiving motor operating state data and a motor control instruction. The MCU 40 generates a pulse width modulation (Pulse Width Modulation, PWM for short) signal according to the motor control instruction, the motor operating state data, and traction battery operating state data, and controls the inverter to provide voltage and current to the motor 30 to control a motor speed, so as to control a driving speed of the vehicle.

Figure 2:
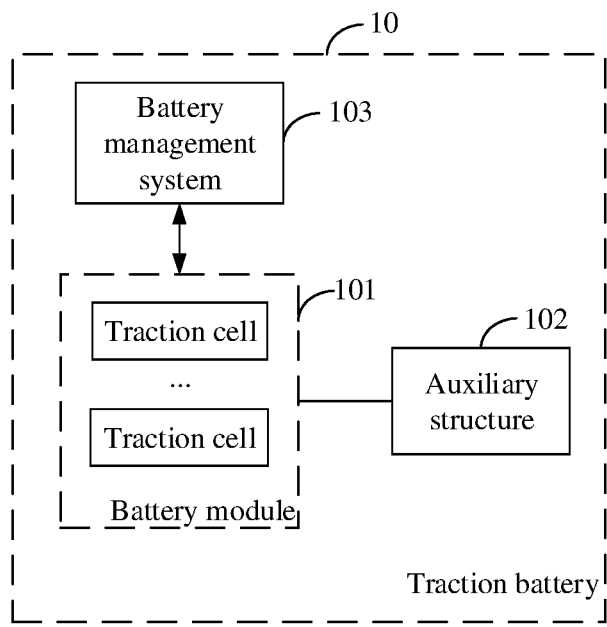
FIG. 2 is a schematic structural diagram of a traction battery according to this application.

As shown in FIG. 2, the traction battery 10 includes a battery module 101, an auxiliary structure 102, and a battery management system 103. The battery module 101 has a plurality of traction cells connected in series and parallel. The traction cells are core components of the traction battery, and also a source of electrical energy provided by the traction battery. The auxiliary structure 102 includes an external frame, a fixture, an electrical connector, and an isolation component. The external frame serves to protect and support the battery module; the electrical connector serves to connect another electrical device, for example, connect the inverter; and an insulation component provides insulating protection. Main functions of the battery management system 103 include charge and discharge management, high voltage control, battery state evaluation, battery data acquisition, battery protection, and battery thermal management.

The thermal management function in the battery management system 103 is used to ensure that the traction battery operates within an appropriate temperature range. Main functions of the battery management system include accurate battery temperature measurement and monitoring, effective cooling upon excessively high temperature of a battery pack, rapid heating upon excessively low temperature, for example, below a temperature threshold, and uniform temperature field distribution guarantee for the battery pack. Limited by traction battery materials, the traction battery can stably exert optimal performance only at its rated cell temperature. Therefore, when the traction battery is to be used in an environment in which a cell temperature is relatively low, the traction battery needs to be heated to the rated cell temperature.

Existing traction battery heating methods may include indirect heating and direct heating. The indirect heating refers to heating a traction battery through a heat source outside the traction battery. An indirect heating method may be air heating, liquid heating, heating using a heating film, or the like. For different heating sources, heating rates of a battery may be different. Because the battery is heated by an external heat source, heat loss occurs on the heat transfer medium, and the efficiency of indirect heating is not high.

The direct heating refers to heating a traction battery from inside. A direct heating method currently proposed in the industry is to heat a traction battery by using a motor.

However, in an existing heating method by using an internal resistance of the traction battery, when the motor supplies a heating current to the traction battery, a rotor generates severe heat, so that a long-term heating mode cannot be maintained and motor NVH problems occur. NVH is an abbreviation of Noise, Vibration, and Harshness. NVH is an important indicator used to measure the vehicle comfort performance.

This application provides a motor, a power system, a control method, and an electric vehicle, to resolve the foregoing problems. The inventive concept of this application is: When a motor is used to directly heat a battery, a conventional operating mode of the motor changes, resulting in an extremely uneven air gap magnetic flux density distribution in the motor in this mode. Consequently, a rotor generates severe heat, long-term heating cannot be maintained, and a motor NVH problem also occurs. Based on the foregoing analysis, this application provides two stator windings. When the motor outputs power, the two windings, or any one of the two windings, or the two windings operate simultaneously, a total magnetic flux of magnetic fields generated by the two windings is controlled to be greater than a magnetic flux generated by any one winding, and magnetic fields generated by the two windings interact with a magnetic field generated by a rotor to output power. When the motor is used to heat the traction battery, currents are applied to the two windings, and a phase difference is caused between the magnetic fields generated by the two windings, where the magnetic fields generated by the two windings cancel each other out, so that magnetic field strength of the stator windings is reduced, and an air gap magnetic flux is reduced, thereby alleviating the heat generation and NVH problems of the motor. Motor vibration is related to the air gap magnetic flux density and uneven magnetic field distribution. Due to decrease in the air gap magnetic flux density, the motor NVH problem caused by non-uniform magnetic field distribution has also been suppressed to some extent.

The following describes a structure of a motor according to an embodiment of this application. The motor provided in this application includes: an N-phase first sub-winding set, an N-phase second sub-winding set, a stator core, and a rotor; where N is a positive integer, and the motor is configured to heat a traction battery and may also be configured to supply power.

The first sub-winding set and the second sub-winding set are wound on the stator core, and the windings may be centralized windings or distributed windings, which are not limited herein.

When the motor heats the traction battery, the first winding set and the second winding set are energized, and a phase difference is caused between a direction of a magnetic field generated by the first winding set and a direction of a magnetic field generated by the second winding set, where a total magnetic flux of the magnetic fields generated by the first winding set and the second winding set is within a preset magnetic flux threshold range.

The preset magnetic flux threshold range is greater than 0 and less than any one of a magnetic flux of the magnetic field generated by the first winding set and a magnetic flux of the magnetic field generated by the second winding set.

When the motor heats the traction battery, the two sub-winding sets generate the magnetic fields that have a phase difference. The two magnetic fields cancel each other out, and the total magnetic field is controlled in a reasonable range, so that NVH requirements can be met in the process of using the motor to heat the traction battery. In addition, the NVH requirements can be met in the heating process through settings of the motor, reducing the difficulty of motor control.

The following uses the distributed windings as an example for description, and those skilled in the art should understand that the centralized windings can also be implemented according to this manner.

For the distributed windings, in an implementation, the second winding set and the first winding set are located in the same stator slot, the first winding set is located at the bottom of the stator slot, and the second winding set is located at the opening of the stator slot. Such arrangement of windings in the same stator slot can achieve no reduction in output power of the motor.

In another implementation, the first winding set and the second winding set may be located in adjacent stator slots, and an original structure of the stator slots may not be changed.

Both the first winding set and the second winding set are configured to be connected to the traction battery through the conversion module, so as to realize electrical energy transfer between the motor and the traction battery.

In addition to heating the traction battery, the motor may also output power. During power output, the motor may apply an alternating current only to the first winding set, and the first winding set generates a magnetic field, which interacts with a magnetic field generated by the rotor, so as to output power. Alternatively, the motor may simultaneously apply an alternating current to the first winding set and the second winding set, and the first winding set and the second winding set jointly generate a magnetic field.

When the motor heats the traction battery, both the first winding set and the second winding set are energized, the rotor is in a locked-rotor state, and the rotor is fixed. In this way, the first winding set and the second winding set serve as energy storage elements, to supply alternating currents to the traction battery, and the traction battery is heated by its internal resistance. In addition, both the first winding set and the second winding set are energized, and a phase difference is caused between the magnetic field generated by the first winding set and the magnetic field generated by the second winding set. The magnetic fields generated by the two sub-windings cancel each other out, the total magnetic field generated by the stator windings approaches zero, air gap magnetic flux density decreases, and magnetic density of the rotor also decreases.

In some embodiments, under the condition that the second winding set and the first winding set are located in the same stator slot, the first winding set is located at the bottom of the stator slot, and the second winding set is located at the opening of the stator slot, when a direction of a current to the first winding set is opposite to that of a current to the second winding set during heating, the direction of the magnetic field generated by the first winding set is opposite to the direction of the magnetic field generated by the second winding set, thereby reducing the air gap magnetic flux and alleviating the heat generation and NVH problems of the motor.

In some embodiments, under the condition that the first winding set and the second winding set are located in adjacent stator slots, when a direction of a current to the first winding set is opposite to that of a current to the second winding set during heating, there is a phase difference between the direction of the magnetic field generated by the first winding set and the direction of the magnetic field generated by the second winding set, and the total magnetic flux of the magnetic fields generated by the first winding set and the second winding set is controlled to be within the preset magnetic flux threshold range, where the preset magnetic flux threshold range is less than a magnetic flux of the magnetic field generated by either the first winding set or the second winding set.

The current to the first winding set and the second winding set and the number of turns of the first winding set and the second winding set are controlled, so that the total magnetic flux of the magnetic fields generated by the first winding set and the second winding set falls within the preset magnetic flux threshold range. The preset magnetic flux threshold is determined based on a maximum heating temperature of the rotor and maximum vibration noise of the rotor. The total magnetic flux is controlled to fall within the preset magnetic flux threshold range, so that the heat and vibration noise of the rotor are controlled within an allowable range.

Winding directions of the first winding set and the second winding set may be different or the same, and there may be a phase difference therebetween. A phase difference between a current to the first winding set and a current to the second winding set is controlled to be within a preset phase threshold, and an amplitude difference therebetween is controlled to be within a preset amplitude threshold, to cause a phase difference and an amplitude difference between the magnetic field generated by the first winding set and the magnetic field generated by the second winding set, so that the magnetic fields generated by the two stator windings cancel each other out, and the total magnetic flux of the magnetic fields generated by the first winding set and the second winding set is within the preset magnetic flux threshold range.

Alternatively, any of the phase difference, amplitude difference, and turns difference may be individually controlled to make the magnetic flux within the preset magnetic flux threshold range, where the preset magnetic flux threshold range is greater than 0 and less than any one of the magnetic flux of the magnetic field generated by the first winding set and the magnetic flux of the magnetic field generated by the second winding set.

For example, the phase difference between the current to the first winding set and the current to the second winding set is controlled to be within a preset phase threshold, and the amplitude difference therebetween is controlled to be within the preset amplitude threshold, so that the total magnetic flux of the magnetic fields generated by the first winding set and the second winding set is controlled to be within the threshold range.

For example, a difference between the number of turns of the first winding set and the number of turns of the second winding set is controlled to be within a preset turns threshold, so that the total magnetic flux of the magnetic fields generated by the first winding set and the second winding set is within the preset magnetic flux threshold range.

The number of winding turns of the first winding set may be different from that of the second winding set. The number of winding turns is a quantity associated with the degree of heat generation and vibration noise of the rotor. The formula for calculating the number of turns is as follows:

$$W1:W2 = E_{\phi 1} : E_{\phi 2} \quad (1)$$

where $E_{\phi 1}$ is a phase potential amplitude of the first winding set, and $E_{\phi 2}$ is a phase potential amplitude of the second winding set.

In addition, the phase potential amplitude of the first winding set and the phase potential amplitude of the second winding set satisfy the following formula:

$$\frac{E_{\phi 1} - E_{\phi 2}}{\omega} \leq \phi_m \quad (2)$$

where $\omega$ is an angular frequency in energizing, and $\phi_m$ is an air gap magnetic flux density threshold that is determined based on maximum allowable heat and maximum vibration noise of the rotor.

Wire diameters or winding turns of the first winding set and the second winding are controlled, so that a resultant magnetic field of the magnetic fields generated by the first winding set and the second winding set can be controlled to be within a required threshold range. For example, both the wire diameters of the first winding set and the second winding set and the winding turns of the first winding set and the second winding set are controlled to be the same, and winding directions thereof are controlled to be opposite, so that a magnetic flux of the foregoing resultant magnetic field approaches zero.

In some embodiments, the first winding set and the second winding set are wound by using the same wire, have the same turns but opposite winding directions, and a phase of the alternating current to the first winding set and a phase of the alternating current to the second winding set are made to be the same, so that the magnetic field of the first winding and the magnetic field of the second winding can be completely canceled out, the air gap magnetic flux density approaches zero, and the heat generation of the rotor approaches zero.

The following analyzes how the heat generated by the rotor and vibration are reduced. The formula for calculating a rotor eddy-current loss is as follows:

$$P_C = K_C f^2 B_S^2 \quad (3)$$

where $P_C$ represents the rotor eddy-current loss, $K_C$ is an eddy-current loss coefficient, f is a current frequency, and $B_S$ is a rotor flux density amplitude.

It can be learned from the foregoing formula that the eddy-current loss of the rotor is proportional to the second power of the magnetic flux density of the rotor. As the magnetic flux density of the rotor decreases, the rotor eddy-current loss is squared down, so that the problems of rotor temperature rise and inability to keep long-term self-heating can be resolved. In addition, because motor vibration is associated with the air gap magnetic flux density and uneven magnetic field distribution, when the air gap magnetic flux density approaches 0, the problem of motor vibration and noise caused by the uneven magnetic field distribution is resolved to some extent.

In the motor provided in this embodiment of this application, when the motor is operating in heating mode, there is a phase difference between the magnetic fields generated by the first winding set and the second winding set, and the magnetic fields cancel each other out, so that the magnetic field strength of each phase stator winding approaches zero, thereby reducing the air gap magnetic flux, reducing motor vibration and rotor heating, and meeting NVH requirements in a process of heating the traction battery by using the motor. The NVH problems can be overcome by setting a current input to the stator windings and a winding method, to further reduce the difficulty of motor control.

Figure 3:
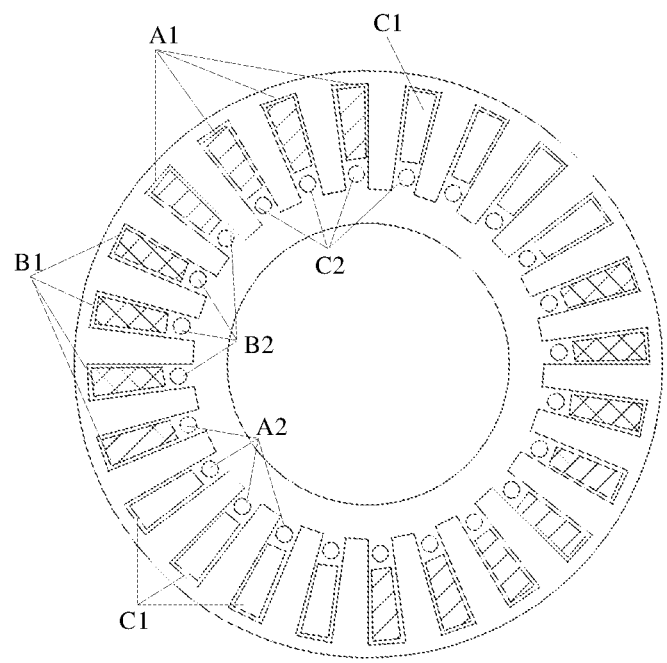
FIG. 3 is a schematic structural diagram of a motor according to an embodiment of this application.

The following describes a structure of a motor according to another embodiment of this application with reference to FIG. 3 by using a three-phase motor as an example. The motor 200 according to another embodiment of this application includes a three-phase symmetrical first winding set 201, a three-phase symmetrical second winding set 202, a stator core 203, and a rotor.

As shown in FIG. 3, the three-phase symmetrical first winding set 201 and the three-phase symmetrical second winding set 202 are both wound on the stator core 203 and are located in the same stator slot. Winding directions of the first winding set and the second winding set may be opposite, or may be the same, or there may be a phase difference therebetween.

Still referring to FIG. 3, the number of turns of the first winding set 201 is a1, and three phase windings are denoted as A1, B1, and C1, respectively; and the number of turns of the second winding set 202 is a2, and three phase windings are denoted as A2, B2, and C2, respectively. Neutral points of the phase windings A1, B1, and C1 of the first winding set are not connected to neutral points of the phase windings A2, B2, and C2 of the second winding set. The phase windings A1, B1, and C1 of the first winding set and the phase windings A2, B2, and C2 of the second winding set are respectively connected to two alternating current sides of a conversion unit.

The three-phase first winding set is wound according to a conventional winding method. The following illustrates a winding method of the first winding set and the second winding set by using an example in which winding directions of the first winding set and the second winding set are opposite: the phase winding A2 and the phase winding C1 are placed in the same slot; the phase winding C2 and the phase winding A1 are placed in one slot; and the phase winding B2 and the phase winding B1 are placed in one slot. Distribution of the first winding set along the circumference is A1→B1→C1, and correspondingly, distribution of the second winding set along the circumference is C2→B2→A2. In this wiring method, when directions of currents to the first winding set and the second winding set are the same, the first winding set and the second winding set generate opposite magnetic fields.

Under the condition that the winding directions of the first winding set and the second winding set are the same or there is a phase difference therebetween, phases and amplitudes of the currents to the first winding set and the second winding set may be controlled to cause a phase difference between the magnetic fields generated by the first winding set and the second winding set, where the magnetic fields generated by the two stator windings cancel each other out.

Figure 4:
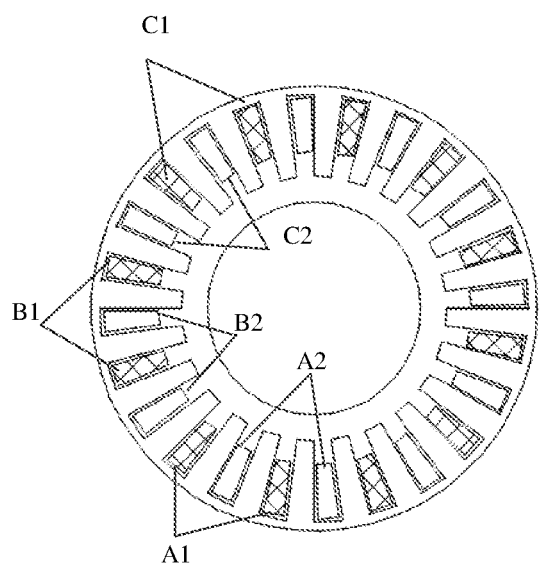
FIG. 4 is a schematic structural diagram of a motor according to another embodiment of this application.

In another embodiment, as shown in FIG. 4, the three-phase symmetrical first winding set 201 and the three-phase symmetrical second winding set 202 are located in adjacent stator slots. In addition, winding directions of the first winding set and the second winding set may be opposite, or may be the same, or there may be a phase difference therebetween. Phases and amplitudes of the currents to the first winding set and the second winding set may be controlled to cause a phase difference between the magnetic fields generated by the first winding set and the second winding set, where the magnetic fields generated by the two stator windings cancel each other out.

When the motor heats the traction battery, both the first winding set and the second winding set are energized, and a phase difference is caused between the magnetic field generated by the first winding set and the magnetic field generated by the second winding set, where the magnetic fields generated by the two sub-windings cancel each other out. In this way, a total magnetic field generated by the stator windings approaches zero, air gap magnetic flux density decreases, and magnetic density of the rotor accordingly becomes small.

In the motor according to this embodiment of this application, when the motor is operating in heating mode, the first winding set and the second winding set are enabled to generate opposite magnetic fields, and the magnetic fields cancel each other out, so that magnetic field strength of each phase stator winding approaches zero, thereby reducing the air gap magnetic flux to reduce motor vibration and rotor heating.

Figure 5:
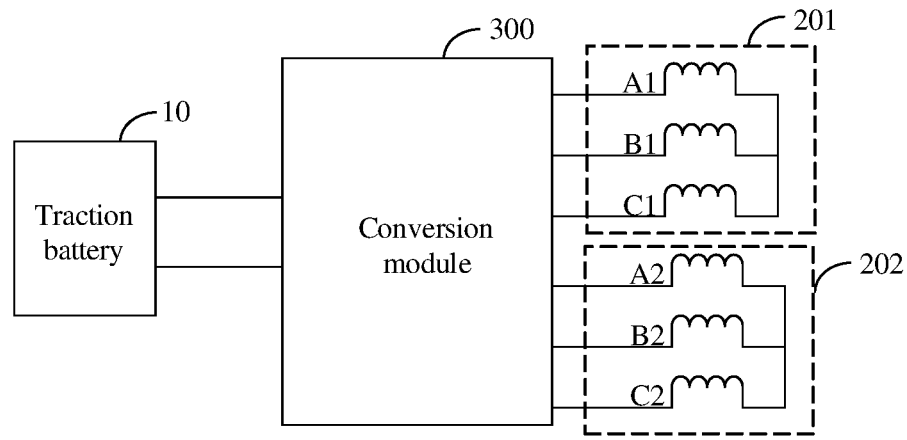
FIG. 5 is a schematic structural diagram of a power system according to another embodiment of this application.

The following describes a structure of a power system according to another embodiment of this application with reference to FIG. 5 by using a three-phase motor as an example. The power system according to another embodiment of this application includes a traction battery 10, a conversion module 300, and a motor. The motor includes a three-phase first winding set 201 and a three-phase second winding set 202. As shown in FIG. 3, only stator windings are shown.

The conversion module 300 includes one direct current side and two alternating current sides, where the direct current side of the conversion module 300 is connected to positive and negative electrodes of the traction battery 10, one alternating current side of the conversion module 300 is connected to the first winding set 201, and the other alternating current side of the conversion module is connected to the second winding set 202.

When the motor outputs power to the outside, the conversion module 300 operates in an inverter state, converts a direct current output by the traction battery into an alternating current, and provides alternating current excitation for the motor. When the motor heats the traction battery, the conversion module 300 serves as a part of a heating circuit, and a stator winding of the motor serves as an energy storage element to supply alternating current to the traction battery.

The following describes how the power system operates: During power output, the traction battery supplies power to only the first winding set through the conversion module, and the first winding set generates a magnetic field, which interacts with a magnetic field generated by a rotor, so as to output power. Alternatively, the traction battery may supply power to both the first winding set and the second winding set, and the magnetic fields generated by the first winding set and the second winding set are superimposed and strengthened, which interact with the magnetic field generated by the rotor, so as to output power. When the motor heats the traction battery, the conversion module is caused to energize the first winding set and the second winding set, and a phase difference is caused between the magnetic field generated by the first winding set and the magnetic field generated by the second winding set, where the magnetic fields generated by the two sub-windings cancel each other out. In this way, a total magnetic field generated by the stator windings approaches zero, air gap magnetic flux density decreases, and magnetic density of the rotor accordingly becomes small, thereby reducing motor vibration and rotor heating.

In the power system according to this application, when the motor needs to operate in heating mode, the rotor is fixed, where fixing the rotor includes controlling the motor rotor in a locked-rotor state and controlling the motor rotor in a relatively static state, meaning that the motor rotor rotates slightly within a rotation deviation range. The conversion module is controlled to energize the first winding set and the second winding set of the motor, and the magnetic fields generated by the two stator windings cancel each other out, so that the air gap magnetic flux density is reduced, and the magnetic density of the rotor accordingly becomes small, thereby reducing motor vibration and rotor heating.

Figure 6:
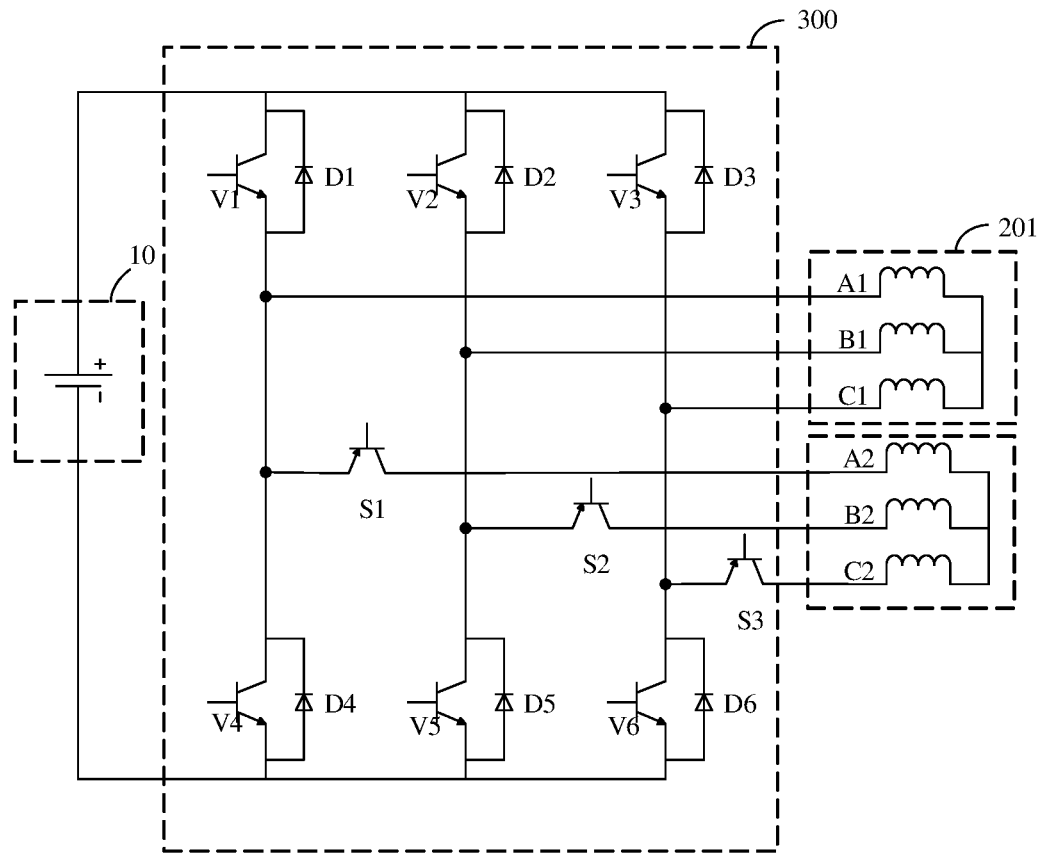
FIG. 6 is a schematic structural diagram of a power system according to another embodiment of this application.

The following describes a structure of a power system according to another embodiment of this application with reference to FIG. 6 by using a three-phase motor as an example. The power system according to another embodiment of this application includes a traction battery 10, a conversion module 300, and a motor. The motor includes a three-phase first winding set 201 and a three-phase second winding set 202.

A difference between the power system according to this embodiment of this application and the power system according to the embodiment shown in FIG. 5 is that the conversion module 300 includes a three-leg inverter and a switch assembly. A first leg includes power tubes V1 and V4, a second leg includes power tubes V2 and V5, and a third leg includes power tubes V3 and V6. A direct current side of the inverter is connected to positive and negative electrodes of the traction battery 10, an alternating current side of the inverter is connected to the first winding set 201, the switch assembly is connected between the alternating current side of the inverter and the second winding set 202, and the switch assembly includes a switch S1, a switch S2, and a switch S3.

Winding directions of the three-phase first winding set 201 and the three-phase second winding set 202 may be the same, or may be opposite, or there may be a phase difference therebetween. On and off states of the power tube V1 to the power tube V6 are controlled, to control current directions, current phases, and current amplitudes of the three-phase first winding set 201 and the three-phase second winding set 202, so that magnetic fields generated in the three-phase first winding set 201 and the three-phase second winding set 202 can cancel each other out.

The following describes how the power system operates:

When the motor outputs power, the switch assembly may be turned off, a pulse width modulation signal PWM signal is output to control terminals of the legs of the inverter, and only the first winding set is energized, so that the first winding set generates a magnetic field which interacts with a magnetic field generated by a rotor to output power.

Alternatively, when the motor outputs power, the switch assembly may be closed, PWM signals are output to control terminals of the legs of the inverter, and both the first winding set and the second winding set are energized, so that directions of the magnetic fields generated by the first winding set and the second winding set are the same, and the magnetic fields generated by the first winding set and the second winding set are superimposed and strengthened. In this way, the magnetic fields generated by the first winding set and the second winding set are strengthened, and interact with a magnetic field generated by the rotor, so as to output power.

Alternatively, when the motor outputs power, the switch assembly may be closed, PWM signals are output to control terminals of the legs of the inverter, and both the first winding set and the second winding set are energized, and a phase difference is caused between magnetic fields generated by the first winding set and the second winding set, where a total magnetic field of the magnetic fields generated by the first winding set and the second winding set is greater than the magnetic field generated by the first winding set or greater than the magnetic field generated by the second winding set. In other words, the total magnetic field of the first winding set and the second winding set are strengthened through superimposition. In this way, the magnetic fields generated by the first winding set and the second winding set are strengthened, and interact with a magnetic field generated by the rotor, so as to output power.

When the motor heats the traction battery, the switch assembly is turned on, pulse width modulation signals PWM signals are input to control terminals of legs of the inverter, the first winding set and the second winding set are energized, and a phase difference is caused between the magnetic field generated by the first winding set and the magnetic field generated by the second winding set, where the magnetic fields generated by the two sub-windings cancel each other out. In this way, a total magnetic field generated by the stator windings approaches zero, air gap magnetic flux density decreases, magnetic density of the rotor accordingly becomes small, and motor vibration and rotor heating are also reduced accordingly.

It should be noted that control signals to the control terminals of the legs are not limited to the PWM signals, and other signals capable of controlling the legs may also be used.

The three-leg inverter and the switch assembly cooperate to control phases and magnitudes of the currents to the windings, and only three control signals need to be input to the inverter, which can reduce control difficulty.

When the motor heats the traction battery, a process in which the first winding set and the second winding set in the motor serve as energy storage elements to charge the battery is described. For example, winding directions of the first winding set and the second winding set are opposite, on and off states of the power tubes V1, V5, and V6 are controlled by using PWM signals, and the S1, S2, and S3 in the switch assembly are closed.

For the first winding set, the power tube V1 on an A1-phase leg, the power tube V5 on a B1-phase leg and the power tube V6 on a C1-phase leg are controlled to be on, and the power tubes V2, V3, and V4 are controlled to be off. In this case, the following discharge circuits are formed: traction battery→power tube V1→A1-phase stator inductor→B1-phase stator inductor→power tube V5→traction battery, and traction battery→power tube V1→A1-phase stator inductor→C1-phase stator inductor→power tube V6→traction battery. In this process, the traction battery discharges electricity and converts the electrical energy into the electromagnetic energy on stator inductors of phases A, B, and C, and the stator inductors store the energy. Magnitudes of the heating currents in the circuits are determined by closed duration of the power tubes V1, V5, and V6, or specifically, determined by frequencies f and duty cycles D of signals driving the power tubes V1, V5, and V6. At the next time (that is, the closed duration elapses), the power tubes V1, V5, and V6 are turned off at the same time. Due to the characteristic that a current in an inductor cannot change suddenly, the following traction battery charging circuits are formed: C1-phase stator inductor→crystal diode D3→traction battery→crystal diode D4→A1-phase stator inductor, and B1-phase stator inductor→crystal diode D2→traction battery→crystal diode D4→A1-phase stator inductor. In the foregoing process of discharging and charging the traction battery, currents flow through the traction battery to heat the traction battery. In this case, the first winding set of the stator generates a stator main magnetic field with a constant direction and alternating amplitudes, where an alternating frequency is a period of the PWM signal.

For the second winding set, the power tubes V1, V5, and V6 are turned on, and the switches S1, S2, and S3 are turned on. At this time, auxiliary charging circuits of the second winding set are similar to those of the first winding set: traction battery→power tube V1→switch S1→A2-phase stator inductor→B2-phase stator inductor→switch S2→power tube V5→traction battery, and traction battery→power tube V1→switch S1→A2-phase stator inductor→C2-phase stator inductor→switch S3→power tube V6→traction battery. In this process, the traction battery discharges electricity and converts the electrical energy into the electromagnetic energy on the stator inductors of phases A, B, and C, and the stator inductors store the energy. Magnitudes of the heating currents in the circuits are determined by closed duration of the power tubes V1, V5, and V6, or specifically, determined by frequencies f and duty cycles D of the signals driving the power tubes V1, V5, and V6. At the next time, the power tubes V1, V5, and V6 are turned off at the same time. Due to the characteristic that a current in an inductor cannot change suddenly, the following auxiliary charging circuits of the traction battery are formed: C2-phase stator inductor→switch S3→crystal diode D3→traction battery→crystal diode D4→switch S1→A2-phase stator inductor, and B2-phase stator inductor→switch S2→crystal diode D2→traction battery→crystal diode D4→switch S1→A1-phase stator inductor.

When a current is input to the second winding set, because the winding direction of the second winding set is opposite to the winding direction of the second sub-winding set, a magnetic field is generated with a direction opposite to that of the magnetic field generated by the first winding set, and an amplitude variation consistent with that of the magnetic field generated by the first winding set. At this time, a resultant magnetic field of the magnetic fields generated by the first winding set and the second winding set is significantly reduced. Wire diameters or winding turns of the first winding set and the second winding are controlled, so that a resultant magnetic field of the magnetic fields generated by the first winding set and the second winding set can be controlled to be within a required threshold range. For example, both the wire diameters of the first winding set and the second winding set and the winding turns of the first winding set and the second winding set are controlled to be the same, and winding directions thereof are controlled to be opposite, so that a magnetic flux of the foregoing resultant magnetic field approaches zero.

In the power system according to this application, when the motor needs to operate in heating mode, the switch assembly is closed and the control terminals of the legs of the inverter are controlled, so that the first winding set and the second winding set of the motor are both energized, and the magnetic fields generated by the two stator windings cancel each other out. In this way, the air gap magnetic flux density is reduced, and the magnetic density of the rotor accordingly becomes small, thereby reducing motor vibration and rotor heating.

Figure 7:
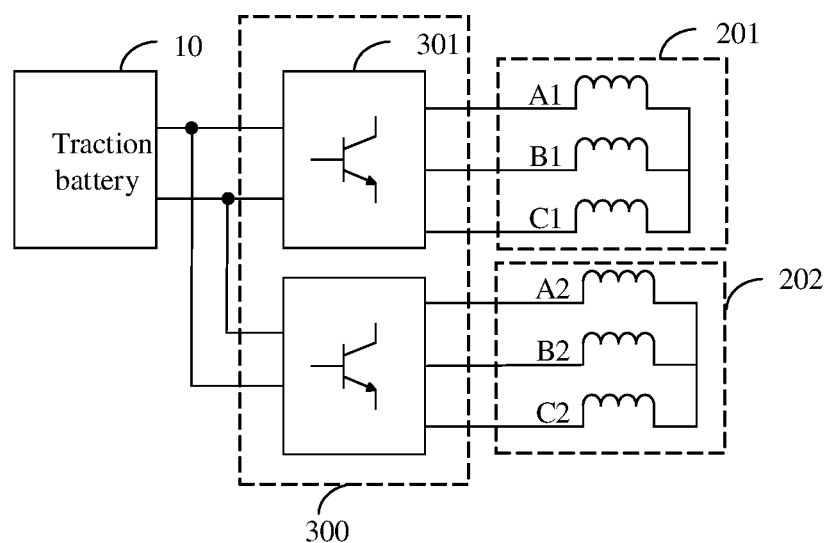
FIG. 7 is a schematic structural diagram of a power system according to another embodiment of this application.

The following describes a structure of a power system according to another embodiment of this application with reference to FIG. 7 by using a three-phase motor as an example. The power system according to another embodiment of this application includes a traction battery 10, a conversion module 300, and a motor. The motor includes a three-phase first winding set 201 and a three-phase second winding set 202.

A difference between the power system according to this embodiment of this application and the power system according to the embodiment shown in FIG. 5 is that the conversion module 300 includes two three-leg inverters 301. Direct current sides of the two inverters 301 are both connected to positive and negative electrodes of the traction battery 10, an alternating current side of one inverter 301 is connected to the first winding set 201, and an alternating current side of the other inverter 301 is connected to the second winding set 202.

The winding methods of the first winding set 201 and the second winding set 202 have been described in detail in the embodiment shown in FIG. 5, and details are not repeated herein.

The following describes how the power system operates: When the motor outputs power, pulse width modulation signals PWM signals are input to control terminals of the legs of the inverters connected to the first winding set, and only the first winding set is energized, so that the first winding set generates a magnetic field which interacts with the magnetic field generated by the rotor, to output power. Alternatively, the first winding set and the second winding set are both energized, so that the first winding set and the second winding set jointly generate the magnetic fields. This has been described in detail in the embodiment shown in FIG. 6, and details are not repeated herein.

When the motor heats the traction battery, pulse width modulation PWM signals are input to control terminals of the legs of the two inverters, the first winding set and the second winding set are energized, and a phase difference is caused between the magnetic field generated by the first winding set and the magnetic field generated by the second winding set, where the magnetic fields generated by the two sub-windings cancel each other out. In this way, a total magnetic field generated by the stator windings approaches zero, air gap magnetic flux density decreases, magnetic density of the rotor accordingly becomes small, and motor vibration and rotor heating are also reduced accordingly.

Phases and magnitudes of currents input to the windings through two three-arm inverters can all be controlled by the switches, thereby improving the control reliability.

In the power system according to this application, the first winding set and the second winding set are each provided with an inverter. When the motor needs to operate in heating mode, the control terminals of the legs of the two inverters are controlled, so that the first winding set and the second winding set of the motor are both energized to reduce motor vibration and rotor heating.

Figure 8:
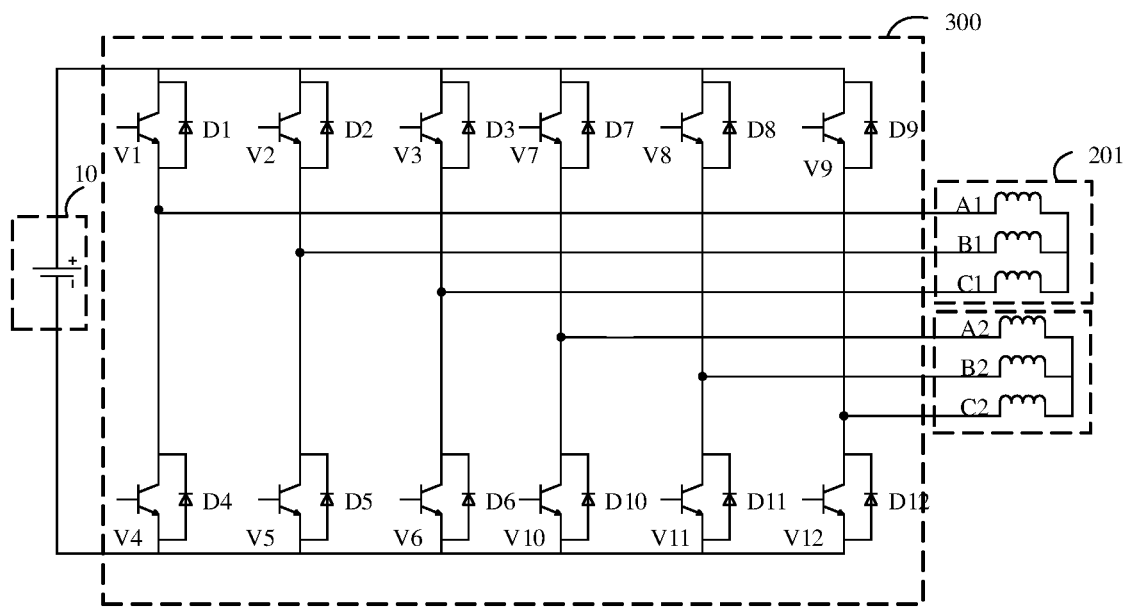
FIG. 8 is a schematic structural diagram of a power system according to another embodiment of this application.

The following describes a structure of a power system according to another embodiment of this application with reference to FIG. 8 by using a three-phase motor as an example. The power system according to another embodiment of this application includes a traction battery 10, a conversion module 300, and a motor. The motor includes a three-phase first winding set 201 and a three-phase second winding set 202.

A difference between the power system according to this embodiment of this application and the power system according to another embodiment is that the conversion module 300 includes a six-leg inverter, where midpoints of the first three legs constitute one alternating current side of the inverter, and midpoints of the last three legs constitute the other alternating current side of the inverter. A direct current side of the inverter is connected to positive and negative electrodes of the traction battery 10, one alternating current side of the inverter is connected to the first winding set 201, and the other alternating current side of the inverter is connected to the second winding set 202. Neutral points of the second winding set may be interconnected to neutral points of the first winding set, as shown in FIG. 8.

The winding methods of the first winding set 201 and the second winding set 202 have been described in detail in the embodiment shown in FIG. 5, and details are not repeated herein.

The following describes how the power system operates: When the motor outputs power, pulse width modulation signals PWM signals are input to control terminals of the legs connected to the first winding set, and only the first winding set is energized, so that the first winding set generates a magnetic field which interacts with the magnetic field generated by the rotor, to output power. Alternatively, both the first winding set and the second winding set are energized, and the magnetic fields generated by the first winding set and the second winding set are superimposed. This has been described in detail in the embodiment shown in FIG. 6, and details are not repeated herein.

When the motor heats the traction battery, pulse width modulation signals PWM signals are input to control terminals of all legs, the first winding set and the second winding set are energized, and a phase difference is caused between the magnetic field generated by the first winding set and the magnetic field generated by the second winding set, where the magnetic fields generated by the two sub-windings cancel each other out. In this way, a total magnetic field generated by the stator windings approaches zero, air gap magnetic flux density decreases, magnetic density of the rotor accordingly becomes small, and motor vibration and rotor heating are also reduced accordingly.

Phases and magnitudes of currents input to the windings by the six-leg inverter can all be controlled by the switches, thereby improving the control reliability.

In the power system provided in this application, the inverter has six legs, midpoints of three legs are connected to the first winding set, and midpoints of the other three legs are connected to the second winding set. When the motor needs to operate in heating mode, the control terminals of all the legs are controlled, so that the first winding set and the second winding set of the motor are both energized to reduce motor vibration and rotor heating.

Those skilled in the art should understand that for both the two three-leg inverters and the six-leg inverter, a phase difference and an amplitude between a current to the first winding set and a current to the second winding set can be controlled by controlling a phase difference between the windings and arrangement and on-off of switches, such that a resultant magnetic field of the magnetic fields generated by the first winding set and the second winding set is within a preset magnetic flux range.

Another embodiment of this application further provides an electric vehicle, including the power system provided in the foregoing embodiments. For details, refer to the relevant descriptions in the foregoing power system embodiments.

The following describes a heating control method according to an embodiment of this application with reference to the motor and the power system described in the foregoing embodiments. The heating control method includes the following steps:

S401: Obtain a cell temperature of a traction battery and operating state information of a motor.

The cell temperature is monitored at any time based on a temperature sensor installed inside the traction battery.

In some embodiments, the traction battery includes a battery management system. The battery management system obtains a traction battery temperature, and transmits battery temperature information to a motor controller unit, where the motor includes the motor controller unit. The motor controller unit receives the battery temperature information.

In some embodiments, the motor controller unit further receives the operating state information of the motor. The operating state information of the motor includes: a temperature of a motor stator, a temperature of a motor stator winding, the motor being in traction battery heating mode, or the motor being in power output mode, the motor being in a locked-rotor state, and/or the motor being in a stopped state, which are not specifically limited herein.

S402: Determine whether the cell temperature and the operating state of the motor meets a heating condition; if yes, go to S403; if no, go to S404 or keep the motor in a stopped state.

In some embodiments, the heating condition of the traction battery includes that the cell temperature is lower than a preset temperature threshold and the motor rotor is in the locked-rotor state, where the preset temperature threshold is determined based on a rated operating temperature of the traction battery.

In some embodiments, the heating condition includes that the cell temperature of the traction battery is lower than a preset temperature threshold and the motor is in the stopped state.

In some embodiments, the heating condition includes that the cell temperature of the traction battery is lower than a preset temperature threshold, the motor is in the locked-rotor state, and a temperature of the motor stator and a temperature of the motor stator winding are lower than a preset motor temperature threshold, where the preset motor temperature threshold is determined based on the rated operating temperature of the traction battery.

A person skilled in the art should understand that the heating condition can be set based on needs, which is not limited herein.

S403: Apply an alternating current to a first winding set and a second winding set, and cause a phase difference between a magnetic field generated by the first winding set and a magnetic field generated by the second winding set, where a total magnetic flux of the magnetic fields generated by the first winding set and the second winding set is within a preset magnetic flux threshold range.

The preset magnetic flux threshold range is less than a total magnetic flux generated by the first winding set, and also less than a total magnetic flux generated by the second winding set, meaning that the magnetic field generated by the first winding set and the magnetic field generated by the second winding set cancel each other out, so that a total magnetic field of the magnetic fields generated by the first winding set and the second winding set is reduced, air gap magnetic density is decreased, generated heat is reduced, and vibration is correspondingly reduced.

Different power system structures have different implementations. When the conversion module includes a three-leg conversion module and a switch assembly, and winding directions of the first winding set and the second winding set are opposite, the switch assembly is closed and PWM signals are input to control terminals of legs the conversion module, so as to apply an alternating current to the first winding set and the second winding set, and ensure a phase difference between directions of the magnetic fields generated by the first winding set and the second winding set.

When the conversion module includes two three-leg inverters, PWM signals are input to all leg control terminals of the two conversion modules, and the PWM signals input to the control terminals of the two inverters are different, causing a phase difference between the directions of the magnetic fields generated by the first winding set and the second winding set.

When the conversion module includes a six-leg inverter, pulse width modulation signals PWM signals are input to six leg control terminals of the conversion module, and PWM signals to three legs are different from PWM signals to the other three legs, causing a phase difference between the directions of the magnetic fields generated by the first winding set and the second winding set.

S404: Apply currents to the first winding set and the second winding set or apply alternating currents to the first winding set and the second winding set, so that the total magnetic flux of the magnetic fields generated by the first winding set and the second winding set falls within the preset magnetic flux threshold range.

When the traction battery heating condition is not met, only the first winding set or the second winding set is energized, and the total magnetic flux of the magnetic fields generated by the first winding set and the second winding set is greater than the preset magnetic flux threshold range, so that the magnetic fields generated by the first winding set and the second winding set are superimposed and strengthened, and both the magnetic field generated by the first winding set and the magnetic field generated by the second winding set interact with the magnetic field generated by the rotor. Due to the strengthened magnetic field, the motor has a large output power and can supply power to the outside.

Those skilled in the art should understand that when the winding directions of the first winding set and the second winding set are the same or there is a phase difference therebetween, a phase difference and an amplitude between a current to the first winding set and a current to the second winding set can be controlled by controlling arrangement and on-off of switches, such that a resultant magnetic field of the magnetic fields generated by the first winding set and the second winding set is within a preset magnetic flux range.

In the power system provided in this application, when it is detected that the traction battery heating condition is met, the first winding set and the second winding set of the motor are both energized by controlling the conversion unit, and a magnetic flux of the resultant magnetic field of the magnetic fields generated by the first winding set and the second winding set is controlled to be within a preset magnetic flux threshold range, to reduce motor vibration and rotor heating.

In conclusion, it should be noted that the foregoing embodiments are merely intended for describing the technical solutions of this application but not for limiting this application. Although this application is described in detail with reference to such embodiments, persons of ordinary skill in the art should understand that they may still make modifications to the technical solutions described in the embodiments or make equivalent replacements to some or technical features thereof, without departing from the scope of the technical solutions of the embodiments of this application.

What is claimed is:

1. A motor, comprising: an N-phase first winding set and an N-phase second winding set, wherein N is a positive integer, and the motor is configured to provide a current through the first winding set and the second winding set to heat a traction battery; and
when the motor heats the traction battery, the first winding set and the second winding set are energized, and a phase difference is caused between a direction of a magnetic field generated by the first winding set and a direction of a magnetic field generated by the second winding set, and a total magnetic flux of the magnetic fields generated by the first winding set and the second winding set is within a preset magnetic flux threshold range, and the preset magnetic flux threshold range is less than any one of a magnetic flux of the magnetic field generated by the first winding set and a magnetic flux of the magnetic field generated by the second winding set;
the first winding set and the second winding set provide current to the traction battery after being energized, and the current passes through an internal resistance of the traction battery to generate heat to heat the traction battery.

2. The motor according to claim 1, wherein the motor comprises a plurality of stator slots, and the first winding set and the second winding set are located in the same stator slot.

3. The motor according to claim 2, wherein the first winding set is located at the bottom of the stator slot, and the second winding set is located at the opening of the stator slot.

4. The motor according to claim 1, wherein the motor comprises a plurality of stator slots, and the first winding set and the second winding set are located in adjacent stator slots.

5. The motor according to claim 1, wherein a phase difference between a current to the first winding set and a current to the second winding set is within a preset phase threshold, and an amplitude difference therebetween is within a preset amplitude threshold.

6. An electric vehicle, comprising a power system, wherein the power system comprises a traction battery, a conversion module, and the motor according to claim 1.

7. A power system, comprising a traction battery, a conversion module, and a motor;
wherein the motor, comprising: an N-phase first winding set and an N-phase second winding set, wherein N is a positive integer, and the motor is configured to provide a current through the first winding set and the second winding set to heat the traction battery;
when the motor heats the traction battery, the first winding set and the second winding set are energized, and a phase difference is caused between a direction of a magnetic field generated by the first winding set and a direction of a magnetic field generated by the second winding set, and a total magnetic flux of the magnetic fields generated by the first winding set and the second winding set is within a preset magnetic flux threshold range, and the preset magnetic flux threshold range is less than any one of a magnetic flux of the magnetic field generated by the first winding set and a magnetic flux of the magnetic field generated by the second winding set;
the first winding set and the second winding set provide current to the traction battery after being energized, and the current passes through an internal resistance of the traction battery to generate heat to heat the traction battery;
wherein a direct current side of the conversion module is connected to positive and negative electrodes of the traction battery, a first alternating current side of the conversion module is connected to the first winding set, and a second alternating current side of the conversion module is connected to the second winding set.

8. The power system according to claim 7, wherein the motor comprises a plurality of stator slots, and the first winding set and the second winding set are located in the same stator slot.

9. The power system according to claim 8, wherein the first winding set is located at the bottom of the stator slot, and the second winding set is located at the opening of the stator slot.

10. The power system according to claim 7, wherein the motor comprises a plurality of stator slots, and the first winding set and the second winding set are located in adjacent stator slots.

11. The power system according to claim 7, wherein a phase difference between a current to the first winding set and a current to the second winding set is within a preset phase threshold, and an amplitude difference therebetween is within a preset amplitude threshold.

12. The power system according to claim 7, wherein the conversion module comprises a three-leg inverter;
wherein a direct current side of the three-leg inverter is connected to the positive and negative electrodes of the traction battery, an alternating current side of the three-leg inverter is connected to the first winding set, and a switch assembly is connected between the alternating current side of the three-leg inverter and the second winding set.

13. The power system according to claim 7, wherein the conversion module comprises two three-leg inverters;
wherein direct current sides of the two three-leg inverters are both connected to the positive and negative electrodes of the traction battery, an alternating current side of one three-leg inverter is connected to the first winding set, and an alternating current side of the other three-leg inverter is connected to the second winding set.

14. The power system according to claim 7, wherein the conversion module comprises a six-leg inverter, and the six-leg inverter comprises two alternating current sides;
wherein a direct current side of the six-leg inverter is connected to the positive and negative electrodes of the traction battery, one alternating current side of the six-leg inverter is connected to the first winding set, and the other alternating current side of the six-leg inverter is connected to the second winding set.

15. The power system according to claim 7, wherein neutral points of the second winding set are connected to neutral points of the first winding set.

16. A heating control method, wherein the method is applied to the power system according to claim 6, and the power system comprises a motor, an inverter, and a traction battery; the method is performed by a motor controller unit; and the method comprises:
receiving a cell temperature of the traction battery and operating state information of the motor;
in a case of a heating condition is met based on the cell temperature and the operating state information, causing the traction battery to energize a first winding set and a second winding set, and causing a phase difference between a direction of a magnetic field generated by the first winding set and a direction of a magnetic field generated by the second winding set, wherein a total magnetic flux of the magnetic fields generated by the first winding set and the second winding set is within a preset magnetic flux threshold range;
in a case of a heating condition is not met based on the cell temperature and the operating state information, causing the traction battery to energize the first winding set and the second winding set to make the motor output power, wherein a total magnetic flux of the magnetic fields generated by the first winding set and the second winding set is within a preset magnetic flux threshold range, or causing the motor to stop working.

17. The method according to claim 16, wherein the inverter comprises a switch assembly; and the energizing a first winding set and a second winding set specifically comprises:
inputting a pulse width modulation PWM signal to the switch assembly of the inverter to control an on-off state of the switch assembly.

* * * * *